US012228292B2

(12) United States Patent
Ha

(10) Patent No.: US 12,228,292 B2
(45) Date of Patent: Feb. 18, 2025

(54) KNOB ASSEMBLY AND APPLIANCE HAVING KNOB ASSEMBLY

(71) Applicant: LG ELECTRONICS INC., Seoul (KR)

(72) Inventor: Yeonsik Ha, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/142,685

(22) Filed: May 3, 2023

(65) Prior Publication Data

US 2023/0272916 A1 Aug. 31, 2023

Related U.S. Application Data

(63) Continuation of application No. 16/986,942, filed on Aug. 6, 2020, now Pat. No. 11,674,690, which is a (Continued)

(30) Foreign Application Priority Data

Jul. 24, 2017 (KR) ........................ 10-2017-0093734

(51) Int. Cl.
*G05G 1/10* (2006.01)
*F24C 3/12* (2006.01)
*G05G 5/05* (2006.01)

(52) U.S. Cl.
CPC ............... *F24C 3/126* (2013.01); *G05G 1/10* (2013.01); *G05G 5/05* (2013.01); *F23N 2235/22* (2020.01);
(Continued)

(58) Field of Classification Search
CPC ........ G05G 1/10; G05G 5/05; G05G 2505/00; G05G 2700/14
See application file for complete search history.

(56) References Cited

U.S. PATENT DOCUMENTS

| | | | |
|---|---|---|---|
| 98,885 | A | 1/1870 | Roberts |
| 113,455 | A | 4/1871 | Scrannage et al. |

(Continued)

FOREIGN PATENT DOCUMENTS

| | | |
|---|---|---|
| CN | 103069227 | 4/2013 |
| CN | 105757133 | 7/2016 |

(Continued)

OTHER PUBLICATIONS

European Search Report dated Jul. 18, 2018 issued in Application No. 18157319.7.

(Continued)

*Primary Examiner* — Thomas C Diaz
(74) *Attorney, Agent, or Firm* — KED & ASSOCIATES

(57) ABSTRACT

A knob assembly and an appliance having a knob assembly are provided. The knob assembly may include a knob configured to be rotatably installed, a knob ring configured to surround the knob and to be rotated independently from the knob, a spring configured to provide an elastic force so as to return the knob ring toward an initial position when the knob ring is rotated to a position spaced apart from the initial position, and a magnetic force provider configured to provide a magnetic force to return the knob ring to the initial position when the knob ring is at a position adjacent to the initial position.

18 Claims, 16 Drawing Sheets

Related U.S. Application Data continuation of application No. 15/899,730, filed on Feb. 20, 2018, now Pat. No. 10,767,868.

(52) U.S. Cl.
CPC ...... *F23N 2241/08* (2020.01); *G05G 2505/00* (2013.01); *G05G 2700/14* (2013.01)

(56) References Cited

U.S. PATENT DOCUMENTS

| | | | |
|---|---|---|---|
| 577,992 | A | 3/1897 | Switzer |
| 636,758 | A | 11/1899 | Casaday |
| 676,118 | A | 6/1901 | Billings |
| 956,912 | A | 5/1910 | Walters |
| 1,358,467 | A | 11/1920 | Robertson |
| 1,491,186 | A | 4/1924 | Bartlett |
| 1,553,312 | A | 9/1925 | Garrecht |
| 1,604,699 | A | 10/1926 | LaCroix |
| 1,689,955 | A | 10/1928 | Meacham |
| 1,898,265 | A | 2/1933 | Ragan |
| 1,947,965 | A | 2/1934 | Beggs |
| 1,981,084 | A | 11/1934 | Teller |
| 2,147,141 | A | 2/1939 | Blancha |
| 2,174,342 | A | 9/1939 | Greulich |
| 2,288,425 | A | 6/1942 | Simborg |
| 2,539,840 | A | 1/1951 | Jones |
| 2,626,661 | A | 1/1953 | McDowell |
| 2,631,704 | A | 3/1953 | De Wiess |
| 2,658,979 | A | 11/1953 | Jungholm |
| 2,667,768 | A | 2/1954 | Winkler |
| 2,708,888 | A | 5/1955 | Varney |
| 2,738,758 | A | 3/1956 | Cutler et al. |
| 2,832,409 | A | 4/1958 | Lee et al. |
| 2,837,154 | A | 6/1958 | Harper et al. |
| 2,865,594 | A | 12/1958 | Winfree |
| 2,895,314 | A | 7/1959 | Helm |
| 2,899,808 | A | 8/1959 | Berens |
| 2,945,364 | A | 7/1960 | Marquis |
| 2,983,119 | A | 5/1961 | Glover |
| 3,212,290 | A | 10/1965 | Walden |
| 3,304,001 | A | 2/1967 | Forte |
| 3,528,263 | A | 9/1970 | Stern |
| 3,572,055 | A | 3/1971 | Billey |
| 3,595,273 | A | 7/1971 | Kolodziej |
| 3,609,994 | A | 10/1971 | Colletti et al. |
| 3,621,158 | A | 11/1971 | Swinstead |
| 3,844,137 | A | 10/1974 | Zugel |
| 3,858,129 | A | 12/1974 | Ashida et al. |
| 4,065,941 | A | 1/1978 | Aoki |
| 4,092,871 | A | 6/1978 | Cunningham |
| 4,449,955 | A | 5/1984 | Watanabe et al. |
| 4,540,383 | A | 9/1985 | Taig |
| 4,692,127 | A | 9/1987 | Wagner |
| 4,868,530 | A | 9/1989 | Ahs |
| 4,964,840 | A | 10/1990 | Kapaan |
| 5,284,455 | A | 2/1994 | Kuribayashi |
| 5,436,413 | A | 7/1995 | Katakami |
| 5,458,028 | A | 10/1995 | Cleveland, III |
| 5,665,946 | A | 9/1997 | Nishijima et al. |
| 5,693,245 | A | 12/1997 | Clizbe |
| 6,031,439 | A | 2/2000 | Adams et al. |
| 6,325,724 | B1 | 12/2001 | Sato |
| 6,621,016 | B2 | 9/2003 | Ohba et al. |
| 6,627,828 | B1 | 9/2003 | McCartney |
| 7,171,727 | B2 | 2/2007 | Wylie et al. |
| 7,479,607 | B2 | 1/2009 | Sack et al. |
| 8,079,287 | B2 | 12/2011 | Castillo |
| 8,783,646 | B2 | 7/2014 | Wasser |
| 8,997,591 | B1 | 4/2015 | Vircks |
| 9,593,855 | B2 | 3/2017 | Moro et al. |
| 9,646,783 | B1 | 5/2017 | Stoufer et al. |
| 10,248,153 | B2 | 4/2019 | Stoufer et al. |
| 10,288,065 | B1 | 5/2019 | Smid |
| 10,466,736 | B2 | 11/2019 | Stoufer |
| 10,732,665 | B2 | 8/2020 | Ha |
| 10,746,409 | B2 | 8/2020 | Ha |
| 2004/0070574 | A1 | 4/2004 | Wylie et al. |
| 2007/0181410 | A1 | 8/2007 | Baier |
| 2008/0053806 | A1 | 3/2008 | Stoffers et al. |
| 2008/0121067 | A1 | 5/2008 | Uhlin |
| 2009/0263186 | A1 | 10/2009 | Hofmann |
| 2009/0293654 | A1 | 12/2009 | Pintauro |
| 2010/0043499 | A1 | 2/2010 | Choi et al. |
| 2010/0188756 | A1 | 7/2010 | Maruyama |
| 2010/0265176 | A1 | 10/2010 | Olsson et al. |
| 2011/0005508 | A1 | 1/2011 | Albizuri |
| 2012/0115096 | A1 | 5/2012 | Gadini et al. |
| 2012/0204854 | A1 | 8/2012 | Dondurur et al. |
| 2012/0215475 | A1 | 8/2012 | Rutledge et al. |
| 2013/0137526 | A1 | 5/2013 | Sugiyama |
| 2014/0260775 | A1 | 9/2014 | Freeman et al. |
| 2015/0005081 | A1 | 1/2015 | Harnetiaux |
| 2015/0122134 | A1 | 5/2015 | Moro et al. |
| 2015/0153047 | A1 | 6/2015 | Moro et al. |
| 2015/0153048 | A1 * | 6/2015 | Moro ...................... F23N 5/203 99/332 |
| 2015/0276230 | A1 | 10/2015 | Chen |
| 2016/0053803 | A1 | 2/2016 | Yu |
| 2016/0097541 | A1 | 4/2016 | Choi |
| 2016/0170436 | A1 | 6/2016 | Farrar et al. |
| 2016/0265786 | A1 | 9/2016 | Choi |
| 2016/0333990 | A1 | 11/2016 | Edinger et al. |
| 2016/0333991 | A1 | 11/2016 | Edinger et al. |
| 2017/0083039 | A1 | 3/2017 | Wuisan et al. |
| 2017/0235326 | A1 | 8/2017 | Koschinat |
| 2017/0351292 | A1 | 12/2017 | Stoufer et al. |
| 2018/0210484 | A1 | 7/2018 | Stoufer |
| 2018/0238465 | A1 | 8/2018 | Ha |
| 2018/0238550 | A1 | 8/2018 | Ha |
| 2018/0238551 | A1 | 8/2018 | Ha |
| 2018/0238552 | A1 | 8/2018 | Ha |
| 2018/0238553 | A1 | 8/2018 | Ha |
| 2018/0238554 | A1 | 8/2018 | Ha |
| 2018/0239386 | A1 | 8/2018 | Ha |
| 2018/0259996 | A1 | 9/2018 | Stoufer et al. |
| 2019/0024903 | A1 | 1/2019 | Ha |
| 2019/0033908 | A1 | 1/2019 | Ha |
| 2019/0101949 | A1 | 4/2019 | Takizawa et al. |
| 2019/0170360 | A1 | 6/2019 | Ha et al. |
| 2019/0170361 | A1 | 6/2019 | Ha |
| 2019/0170362 | A1 | 6/2019 | Morton |
| 2019/0170364 | A1 | 6/2019 | Ha |
| 2020/0240645 | A1 | 7/2020 | Ha |
| 2020/0333015 | A1 | 10/2020 | Ha |
| 2020/0333822 | A1 | 10/2020 | Ha |
| 2022/0244752 | A1 | 8/2022 | Ha |

FOREIGN PATENT DOCUMENTS

| | | | |
|---|---|---|---|
| DE | 3940378 | 6/1990 | |
| DE | 102 55 676 | 6/2004 | |
| DE | 10-2005-045300 | 9/2006 | |
| DE | 10-2007-035564 | 1/2009 | |
| EP | 0 412 041 | 2/1991 | |
| EP | 0 584 400 | 3/1994 | |
| EP | 1 420 181 | 5/2004 | |
| EP | 1881514 | 1/2008 | |
| EP | 1 962 167 | 8/2008 | |
| EP | 2 088 357 | 8/2009 | |
| EP | 2 587 161 | 5/2013 | |
| EP | 2 703 671 | 3/2014 | |
| EP | 3 492 815 | 6/2019 | |
| EP | 3493721 | 6/2019 | |
| GB | 218425 A * | 7/1924 | ............... G05G 1/08 |
| GB | 322884 | 12/1929 | |
| GB | 2 081 874 | 2/1982 | |
| GB | 2 178 134 | 2/1987 | |
| JP | S 5660922 | 5/1981 | |
| JP | S56-77793 | 6/1981 | |
| JP | S 5761860 | 4/1982 | |
| JP | 60065909 | 4/1985 | |
| JP | 60249729 | 12/1985 | |
| JP | H 01-136723 | 9/1989 | |
| JP | 2716246 | 2/1998 | |

(56) References Cited

FOREIGN PATENT DOCUMENTS

| | | |
|---|---|---|
| JP | H10-258694 | 9/1998 |
| JP | H 11-000140 | 11/1999 |
| JP | 2006-118539 | 5/2006 |
| JP | 2012-003588 | 1/2012 |
| JP | 2015-190560 | 11/2015 |
| JP | 2016-217593 | 12/2016 |
| JP | 2017-157397 | 9/2017 |
| KR | 20-1989-0013720 | 8/1989 |
| KR | 10-1994-0026468 | 12/1994 |
| KR | 10-1998-0021844 | 6/1998 |
| KR | 1998-0020482 | 7/1998 |
| KR | 20-1998-0052401 | 10/1998 |
| KR | 1998-0052401 | 10/1998 |
| KR | 10-0175848 | 3/1999 |
| KR | 10-1999-0031371 | 5/1999 |
| KR | 10-2000-0008085 | 2/2000 |
| KR | 20-2000-0006636 | 4/2000 |
| KR | 20-0181156 | 5/2000 |
| KR | 20-0193805 | 8/2000 |
| KR | 10-2003-0047508 | 6/2003 |
| KR | 10-2005-0104447 | 11/2005 |
| KR | 10-2006-0035373 | 4/2006 |
| KR | 10-0646087 | 11/2006 |
| KR | 10-2007-0064981 | 6/2007 |
| KR | 10-2007-0077412 | 7/2007 |
| KR | 10-0854156 | 8/2008 |
| KR | 10-0941463 | 2/2010 |
| KR | 10-1140121 | 4/2012 |
| KR | 10-2012-0140490 | 12/2012 |
| KR | 10-2015-0128172 | 11/2015 |
| WO | WO 2010/134040 | 11/2010 |
| WO | WO 2013/175438 | 11/2013 |
| WO | WO 2013/175441 | 11/2013 |
| WO | WO 2015/008092 | 1/2015 |
| WO | WO 2015/171503 | 11/2015 |
| WO | WO 2017/133458 | 8/2017 |

OTHER PUBLICATIONS

European Search Report dated Jul. 18, 2018 issued in Application No. 18157431.0.
European Search Report dated Jul. 19, 2018 issued in Application No. 18157306.4.
European Search Report dated Jul. 19, 2018 issued in Application No. 18157312.2.
Korean Notice of Allowance dated Jul. 20, 2018 issued in Application No. 10-2017-0023774.
European Search Report dated Oct. 10, 2018 issued in Application No. 18157383.3.
European Search Report dated Nov. 27, 2018 issued in Application No. 18157306.4.
European Office Action dated Aug. 5, 2019.
Korean Office Action dated Aug. 20, 2019.
U.S. Office Action dated Aug. 21, 2019 issued in U.S. Appl. No. 15/899,797.
U.S. Office Action dated Dec. 11, 2019 issued in U.S. Appl. No. 15/899,637.
Korean Notice of Allowance dated Jan. 13, 2020 issued in Application No. 10-2017-0093734.
Korean Notice of Allowance dated Jan. 13, 2020 issued in Application No. 10-2017-0167073.
U.S. Final Office Action dated Jan. 16, 2020 issued in U.S. Appl. No. 15/899,797.
Korean Office Action dated Jan. 21, 2020 issued in Application No. 10-2017-0094806.
United States Office Action dated Jan. 24, 2020 issued in U.S. Appl. No. 15/899,730.
European Search Report dated Feb. 24, 2020 issued in Application No. 19209191.6.
Chinese Office Action dated Mar. 4, 2020 issued in Application No. 201811486621.X.
U.S. Notice of Allowance dated Mar. 27, 2020 issued in U.S. Appl. No. 15/899,797.
Korean Office Action dated Apr. 9, 2020 issued in Application No. 10-2018-0136829.
Korean Office Action dated Apr. 26, 2020 issued in KR Application No. 10-2018-0152988.
U.S. Office Action dated Jun. 5, 2020 issued in U.S. Appl. No. 15/899,507.
U.S. Notice of Allowance dated Sep. 9, 2020 issued in U.S. Appl. No. 15/899,583.
Korean Office Action dated Jul. 29, 2020 issued in KR Application No. 10-2017-0094806.
Korean Office Action dated Oct. 17, 2020 issued in KR Application No. 10-2018-0136829.
Korean Office Action dated Oct. 17, 2020 issued in KR Application No. 10-2018-0152988.
Korean Notice of Allowance dated Jan. 13, 2021 issued in Application No. 10-2020-0045531.
Korean Office Action dated Mar. 9, 2021 issued in Application No. 10-2021-0008599.
Korean Notice of Allowance dated Apr. 5, 2021 issued in Application No. 10-2020-0048575.
European Search Report dated Jan. 25, 2021 issued in EP Application No. 20201469.2.
European Search Report dated Jan. 25, 2021 issued in EP Application No. 20201473.4.
European Search Report dated Jan. 26, 2021 issued in EP Application No. 20201471.8.
Korean Office Action dated May 26, 2021 issued in KR Application No. 10-2021-0048242.
Korean Notice of Allowance dated Aug. 13, 2021 issued in KR Application No. 10-2021-0048242.
European Search Report dated Jun. 7, 2021 issued in Application No. 20201468.4.
United States Office Action dated Nov. 19, 2021 issued in co-pending related U.S. Appl. No. 16/911,896.
Korean Notice of Allowance dated Sep. 28, 2021.
Korean Notice of Allowance dated Apr. 14, 2022 issued in Application No. 10-2017-0167071.
U.S. Notice of Allowance dated Feb. 8, 2023 issued in U.S. Appl. No. 16/986,942.

* cited by examiner

KNOB ASSEMBLY AND APPLIANCE HAVING KNOB ASSEMBLY

CROSS-REFERENCE TO RELATED APPLICATIONS

This application is a Continuation Application of prior U.S. patent application Ser. No. 16/986,942 filed Aug. 6, 2020, which is a Continuation of U.S. patent application Ser. No. 15/899,730, filed Feb. 20, 2018, now U.S. Pat. No. 10,767,868, which claims priority under 35 U.S.C. § 119 to Korean Application No. 10-2017-0093734 filed on Jul. 24, 2017, whose entire disclosures are hereby incorporated by reference.

BACKGROUND

1. Field

A knob assembly and an appliance having a knob assembly are disclosed herein.

2. Background

Cooking appliances are appliances that cook food or other items (hereinafter "food"), and may be installed or provided in a kitchen space. Such cooking appliances may be classified in various ways according to, for example, heat sources used therein, forms or shapes thereof, and types of fuel. Cooking appliances may be classified as an open-type and a closed-type according to a form of space in which food is placed. Closed-type cooking appliances may include an oven or a microwave, for example, and open-type cooking appliances may include a cooktop or a hob, for example.

Closed-type cooking appliances may be cooking appliances in which a space in which food may be placed is sealed, and the sealed space may be heated to cook food. Open-type cooking appliances may be cooking appliances in which food or a container filled with food may be placed in an open space, and the food or the food container may be heated to cook the food.

A cooking compartment, which may be a space sealed when food is placed therein, may be provided in closed-type cooking appliances. Such a cooking compartment may be a space in which food may be cooked. A heat source may be provided inside or outside the cooking compartment to heat the cooking compartment.

Complex cooking appliances, in which a closed-type cooking appliance and an open-type cooking appliance may be installed and a plurality of heat sources may be combined so that various foods may be cooked and a plurality of foods may be simultaneously cooked, have been proposed. In a complex cooking appliance, an open-type cooking appliance may be provided above a closed-type cooking appliance. A plurality of heaters or burners may be installed in the open-type cooking appliance to allow a plurality of foods or dishes to be cooked simultaneously. A user may use a closed-type cooking appliance when barbecuing, baking, or roasting meat or fish, for example, and may use an open-type cooking appliance when cooking by heating a container filled with food.

A manipulation part or manipulator may be provided at a front surface of a cooking appliance. The manipulator may be provided at a portion corresponding to an upper front surface of the cooking appliance, and a plurality of knobs that may adjust a heating power may be installed at the manipulator.

A knob may be provided to allow a user to manipulate the knob via rotation, and a knob ring may be provided to surround the knob. The knob may be provided to be rotatable so as to adjust an opening amount of a valve, and the knob ring may be installed to surround the knob and improve an appearance of the knob.

In a cooking appliance including an oven or a complex cooking appliance, a timer that controls an operation time of the cooking appliance may be further included in addition to a knob that adjusts heating power. Such a timer may be installed in a manipulator along with a knob but may be a separate manipulation switch independent from the knob.

However, in a complex cooking appliance in which a plurality of heat sources may be combined, numerous knobs may already be installed in or on a manipulator. Thus, when manipulation switches such as a timer are added thereto and a number of components provided in or on the manipulator is increased, a user may have difficulty in selecting a knob or a manipulation switch suitable for a certain purpose. Also, an exterior of a front surface of the cooking appliance may not appear to be simple or clean.

BRIEF DESCRIPTION OF THE DRAWINGS

The embodiments will be described in detail with reference to the following drawings in which like reference numerals refer to like elements wherein.

DETAILED DESCRIPTION

Figure 1:
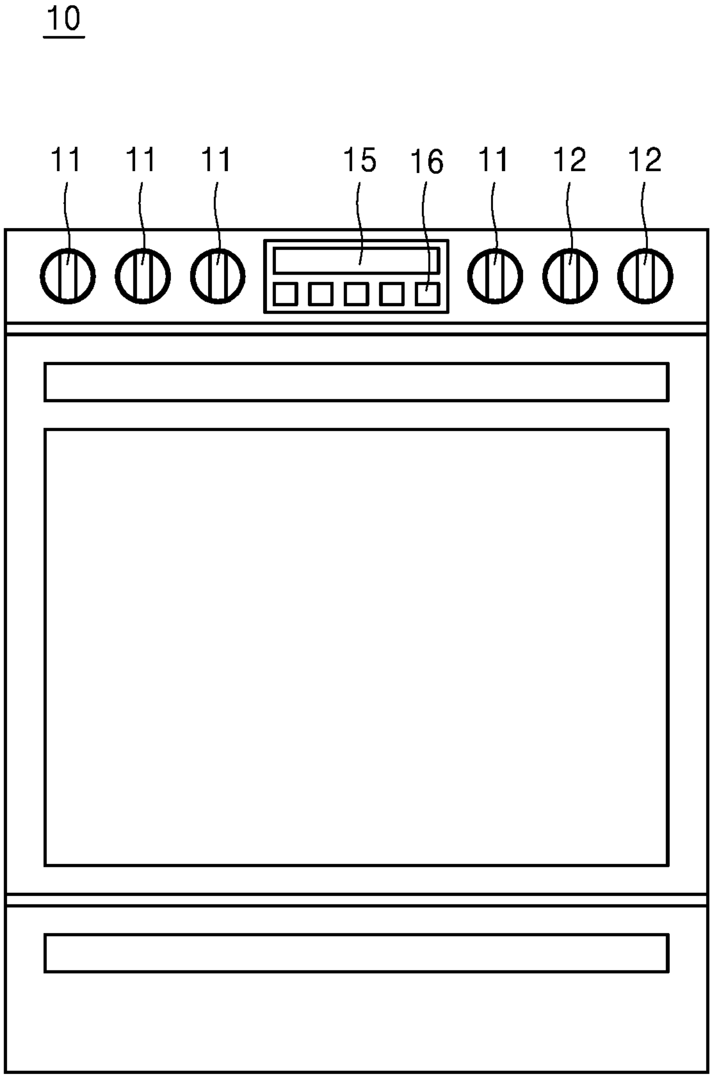
FIG. 1 is a view of a cooking appliance.
Figure 2:
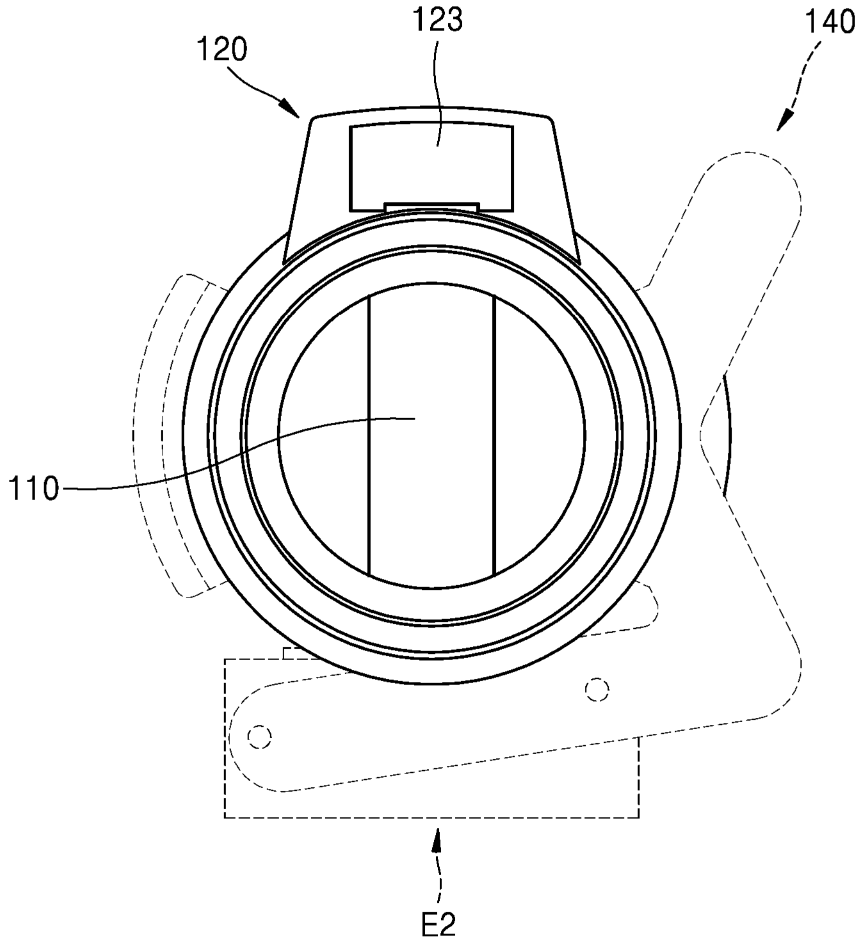
FIG. 2 is a front view of a front surface of a knob assembly according to an embodiment.

Referring to FIG. 1, an appliance such as an appliance 10 having an oven may include a knob or plurality of knobs 11 formed at a front surface to operate the appliance, a knob or plurality of knobs 12 that adjust time of a timer, a display 15 that displays a state of the appliance, and a switch or plurality of switches 16 for other operations. An appliance such as a cooking appliance having an oven may often require long operation time. Thus, a timer that sets an operation time may be installed in such an appliance.

The knob 11 that adjusts a heating power, a rotational speed, a strength of operation, and the knob 12 that adjusts time of a timer may be provided as separate switches or knobs having different shapes or operated by different methods. However, for design and convenience of manipulation, the knobs 11 and 12 may be provided in which a plurality of rotary switches of a same type are arranged. The display 15 may display, for example, a manipulation state of an appliance. When the appliance is a cooking appliance, pieces of information displayed on the display 15 may include, for example, an output or temperature of a burner, time of a timer, and a cooking mode of an automatic cooking function.

However, when a number of heating elements having a timer function is increased, a number of timer handles or knobs may also increase. Accordingly, the front surface of the appliance may become extremely complicated, and a problem in which an appearance of the front surface of the appliance may be degraded may occur. In the appliance, the knob 11 that operates the appliance and the knob 12 that adjusts time of a timer may be provided as switches of the same type. Thus, it may be difficult for a user to recognize which function is performed by which knob in the design, and a problem in which convenience in use may be decreased may occur.

To solve the above problems, a knob assembly with an improved structure to improve an appearance of a front surface of an appliance as well as to provide improved convenience and appliance having the knob assembly may be provided.

Hereinafter, each element of a knob assembly according to an embodiment may be described. The case in which the appliance is a cooking appliance may be described as an example. However, the appliance is not limited thereto, and in addition to the cooking appliance, may include any appliance in which both a knob for operation of an appliance, such as, for example, a heater for heating and a dish washer and a knob with a timer that adjusts an operation time of the appliance, may be provided.

Referring to FIG. 2 to FIG. 5, a knob 110 may be connected to an adjusting shaft 194 of a valve assembly 190 provided to adjust a heating power. The knob 110 may be configured with a no-return type rotary switch, for example. Such a knob 110 may be provided in which a position thereof after a user rotates the knob 110 is maintained without change, and an output of a corresponding heating element may be recognized according to an angle at which the knob 110 is rotated. For example, in a gas burner, a valve assembly 190 may be a valve assembly, and in an electric stove or an induction stove, the valve assembly 190 may be an output adjusting means or a variable resistor configured to adjust an output.

The knob 110 may include a protruding handle portion having a circular shape. Although the handle portion may be in a bar shape, the shape of the handle portion is not limited thereto and may be various other shapes. The knob 110 may be manufactured, for example, with a synthetic resin injection material or manufactured by processing a metal material. The material and shape of the knob 110 may be changed in various ways.

The knob ring 120 may be provided at an outer peripheral surface of the knob 110 to improve an exterior around the knob 110. The knob ring 120 may support the knob 110 and may improve an exterior appearance of the cooking appliance by finishing an exterior of the knob 110. The knob ring 120 may also restrict a position of the knob 110.

As the valve assembly 190 in the form of a flexible valve in which the adjusting shaft 194 may be movable may be applied, the knob 110 may be arbitrarily moved in vertical and horizontal directions when the knob 110 is coupled to the adjusting shaft 194. Thus, the knob ring 120 may be installed not to move in the vertical and horizontal directions and may surround the knob 110 to restrict the position of the knob 110, thereby allowing the knob 110 to be maintained at a predetermined position.

The knob ring 120 may be provided to serve as a timer manipulating switch and a display configured to display time of a timer and a size of heating power. That is, the knob ring 120 may be installed to be rotatable independently from the knob 110, and the time of the timer may be set by rotating the knob ring 120. A display 123 may be provided at the knob ring 120, and the time of the timer and the size of heating power may be displayed through the display 123.

A knob encoder E1 configured to sense a rotational amount of the knob 110 and a knob ring encoder E2 configured to sense a rotational amount of the knob ring 120 may be provided in the knob assembly. The knob encoder E1 may sense a rotational amount of a gear G1 coupled to the adjusting shaft 194. The knob ring encoder E2 may sense rotation of a knob ring gear G2 provided at an actuating ring 150.

The knob 110 and the knob ring 120 may be installed to be exposed to the outside of a front panel c of a cooking appliance, and heating power and time of a timer, may be displayed on the display 123 provided at the knob ring 120. The heating power displayed on the display 123 may be a value calculated based on a value of a sensed rotational amount of the knob 110, and the time of the timer displayed on the display 123 may be a value calculated based on a value of a sensed rotational amount of the knob ring 120.

The display 123 may be configured in which a heating power-displaying portion and a timer time-displaying portion may be separately provided. However, a heating power or a timer time may be selectively displayed on the display 123. For example, the display 123 may be operated such that only a heating power may be displayed when a timer is not set, and the heating power may be displayed for a predetermined amount of time, and then a timer time may be displayed for a predetermined amount of time when the timer is set.

A color of light when a heating power is displayed and color of light when a timer time is displayed may be made different so that a user may easily recognize which of the heating power and the timer time the display may be indicating. For example, the heating power may be displayed with a red color, and the timer time may be displayed with a white or a blue color. When both the heating power and the timer time are displayed, the heating power may be displayed for 2 seconds and then the timer time may be displayed for 2 seconds. Both the heating power and the timer time may be displayed through the knob assembly. In this way, information necessary for using a cooking appliance may be effectively provided to a user without a separate display being installed at the front panel c.

The actuating ring 150 may be coupled to a rear or second surface of the knob ring 120 and may be provided to integrally rotate with the knob ring 120. A rotational amount of the actuating ring 150 and a rotational amount of the knob ring 120 may be the same, and therefore, manipulation of the knob ring 120 may be sensed by sensing the rotational amount of the actuating ring 150. For this, the knob ring gear G2 may be provided at the actuating ring 150.

The actuating ring 150 may include a coupling shaft 151, a flange 152, and a wing 153. The coupling shaft 151 may be a portion that passes through a support frame 140 and may be supported to be rotatable by the support frame 140. The coupling shaft 151 may be formed in a shape of a circular tube, and a space through which the adjusting shaft 194 may pass may be formed inside the coupling shaft 151. The coupling shaft 151 may be coupled to the knob ring 120 via the front panel c and the support frame 140, and in this way, coupling that allows the actuating ring 150 to be integrally rotated with the knob ring 120 may be performed.

The flange 152 may be in a shape of a flange that protrudes from a rear or second end of the coupling shaft 151 outward in a radial direction of the coupling shaft 151. With respect to the front panel c, a first direction toward the outside of the front panel c may be referred to as the front, and a second direction toward the valve assembly 190 may be referred to as the rear. By forming a flat surface coming into contact with the support frame 140 behind the support frame 140, the flange 152 may prevent deviation of the actuating ring 150 toward the front and allow the actuating ring 150 to be stably rotated without swinging in frontward and rearward directions.

The wing 153 may protrude from an outer peripheral surface of the coupling shaft 151 outward in the radial direction of the coupling shaft 151. Unlike the flange 152 formed in the shape of a disc that surrounds the coupling shaft 151, the wing 153 may be formed in a shape of a bar extending outward in the radial direction of the coupling shaft 151.

The wing 153 may be inserted into a fixing frame 160. The wing 153 may move within a movement-possible region or movement range inside the fixing frame 160, and movement thereof may be limited from a point interfering with an upper inner wall or a lower inner wall of the fixing frame 160. When the movement range of the wing 153 is limited by the fixing frame 160, an angle of rotation in both directions of the actuating ring 150 may be limited to a predetermined range. The wing 153 may also include a coupling portion between elastic members or springs S1, S2 and the actuating ring 150.

The support frame 140 may be coupled to the front panel c and may support the knob ring 120. The knob 110 and the knob ring 120 may be coupled at aligned positions at or on the front panel c, and the front panel c may be formed of a thin metal plate. When a hole h is formed in the front panel c, and the knob ring 120 is rotated by being directly rubbed against the hole h, a problem in which the knob ring 120 may be cut due to the front panel c may occur. In consideration of such an aspect, a structure in which the support frame 140 may be installed behind the hole h formed in the front panel c, and the knob ring 120 may be rotated while the knob ring 120 is supported by the support frame 140 so that generation of friction between the knob ring 120 and the front panel c during rotation of the knob ring 120 may be suppressed may be provided.

The support frame 140 may include a frame main body 141, a through-hole 143, and a support 145. The frame main body 141 may form a frame of the support frame 140 and may be coupled to the front panel c to be provided behind the front panel c. The through-hole 143 corresponding to an outer diameter of the actuating ring 150 coupled to the knob ring 120 may be formed to pass through an inner side of the frame main body 141. The through-hole 143 may form a path for the coupling shaft 151 of the actuating ring 150 to pass through the support frame 140 in the frontward and rearward directions.

The support 145 forming a sidewall configured to support the coupling shaft 151 to be rotatable around the through-hole 143 may be formed outside the through-hole 143. The actuating ring 150 may be seated on the support 145, and accordingly, the actuating ring 150 may be supported by the support frame 140 to be rotated at a predetermined position.

The knob ring 120 coupled to such an actuating ring 150 may be supported to be rotated about a predetermined axis on the support frame 140 by a support structure between the support frame 140 and the actuating ring 150. Because a position of the knob ring 120 may be determined by the support frame 140, and the support frame 140 may be fastened to the front panel c, the position of the knob ring 120 may be fixed with respect to the front panel c.

The support frame 140 may surround the outer peripheral surface of the actuating ring 150 and may support the actuating ring 150 to be rotatable about the predetermined axis. The support frame 140 may be coupled to a guide rod 210 provided at a burner frame 200 to which the valve assembly 190 may be fixed. The guide rod 210 may be provided to fix the burner frame 200 and the support frame 140, and the support frame 140 coupled to such a guide rod 210 may be fixed to a predetermined position with respect to the burner frame 200.

The fixing frame 160*i* may be provided to prevent the actuating ring 150 from deviating rearward toward the inside of the appliance from the fixing frame 160, may be installed at a rear or second side of the front panel c, and may be fastened and fixed to the support frame 140 by a fastening means, such as, for example, a screw.

The fixing frame 160 may also restrict a range of rotation of the actuating ring 150. The fixing frame 160 may limit rotations of the actuating ring 150 and the knob ring 120 so that the actuating ring 150 and the knob ring 120 may be rotatable in a horizontal direction only within a predetermined angle range.

The fixing frame 160 may be formed, for example, in the shape similar to that of a bow tie. In the fixing frame 160, portions corresponding to wings of a bow may be portions configured to limit rotation of the actuating ring 150 so that the actuating ring 150 may be rotatable only within a predetermined angle range, and a portion connecting both wings may be a portion configured to prevent deviation of the actuating ring 150 rearward.

The fixing frame 160 may include a fixing portion 161 and a wing insertion portion 163. The fixing portion 161 may be coupled to the support frame 140 and may support the actuating ring 150. The fixing portion 161 may correspond to a portion connecting both wings in the fixing frame 160 formed in the shape similar to that of a bow tie. The fixing portion 161 may be provided at a rear or second side of the flange 152 of the actuating ring 150 and may be coupled to the frame main body 141, while the flange 152 may be provided therebetween, to support the actuating ring 150 in a direction in which the flange 152 and the wing 153 may be adhered to the frame main body 141.

In this way, a position of the actuating ring 150 in the frontward and rearward directions may be restricted in which a front or first side of the flange 152 may be supported by the support frame 140, and the rear or second side of the flange 152 may be supported by the fixing frame 160. The actuating ring 150 may be rotated at a predetermined position while the position thereof in the frontward and rearward directions may be restricted, and in this way, the actuating ring 150 may stably fix a rotary position of the knob ring 120.

The wing insertion portion 163 may be provided at each side of the fixing portion 161. The wing insertion portions 163 may correspond to portions corresponding to wings of the bow in the fixing frame 160 formed in the shape similar to that of a bow tie. In each of the wing insertion portions 163, the wing 153 of the actuating ring 150 may be inserted to be rotated within a predetermined angle range. That is, the wing 153 inserted into the wing insertion portion 163 may move within a movement-possible region or movement range inside the wing insertion portion 163, and movement thereof may be limited from a point interfering with an upper inner wall or a lower inner wall of the wing insertion portion 163. When the movement range of the wing 153 is limited by the wing insertion portion 163, an angle of rotation in both directions of the actuating ring 150 may be limited to a predetermined range.

A bearing shell 130 may be as a bearing that facilitates manipulation of the knob ring 120. The bearing shell 130 may include a cylindrical portion 134 formed in a cylindrical shape and a disc 132 bent from the cylindrical portion 134 and protruding in a radial direction. The cylindrical portion 134 may be inserted between the outer peripheral surface of the actuating ring 150 coupled to the knob ring 120 and an inner peripheral surface of the fixing frame 160. The cylindrical portion 134 may reduce friction between the actuating ring 150 and the fixing frame 160.

The disc 132 may be inserted between the front panel c and the knob ring 120. The disc 132 may reduce friction between the knob ring 120 and the front panel c. The disc 132 may also cause the knob ring 120 to be spaced apart from the front panel c at a predetermined interval to suppress or prevent the front panel c from being scratched due to the knob ring 120 coming into contact with the front panel c during manipulation of the knob ring 120.

The knob ring 120 may be provided in a form in which a return-type manipulation may be possible. For example, the knob ring 120 may be manipulated to be rotatable within a predetermined angle range clockwise or counterclockwise and then may be returned to its original or initial position when an external force is released.

The elastic members or springs S1 and S2 may provide a restoration force to return the knob ring 120 to its initial position. The springs S1 and S2 may include a first spring S1 configured to provide a restoration force clockwise and a second spring S2 configured to provide a restoration force counterclockwise. For example, each of the springs S1 and S2 may be in the form of a coil spring having one or a first longitudinal side fixed to the actuating ring 150 and another or second longitudinal side fixed to the support frame 140.

Wing-side couplers 155 to which the first longitudinal side of the springs S1 and S2 may be coupled may be provided at respective wings 153 of the actuating ring 150, and frame-side couplers 147 and 148 to which the second longitudinal side of the springs S1 and S2 may be coupled may be provided at respective frame main body 141 of the support frame 140. The wing-side couplers 155 and the frame-side couplers 147 and 148 may be protrusions protruding from the respective wings 153 or frame main body 141. The springs S1 and S2 may be fixed by hooks respectively provided at both longitudinal sides of the springs S1 and S2 being hooked to the wing-side couplers 155 and the frame-side couplers 147 and 148.

The frame-side couplers 147 and 148 may include a first frame-side coupler 147 provided above the wing-side couplers 155 and having the first spring S1 coupled thereto, and a second frame-side coupler 148 provided below the wing-side couplers 155 and having the second spring S2 coupled thereto. That is, the first spring S1 may be installed in the form in which one longitudinal side thereof may be coupled to the wing-side coupler 155 and another longitudinal side thereof may be coupled to the first frame-side coupler 147. The second spring S2 may be installed in the form in which one longitudinal side thereof may be coupled to the other wing-side coupler 155 and another longitudinal side thereof may be coupled to the second frame-side coupler 148.

When an external force is not applied, elastic forces of the first spring S1 and the second spring S2 may be balanced, and accordingly, the knob ring 120 may be maintained at the initial position. Because the actuating ring 150 and the knob ring 120 are integrally rotated, the knob ring 120 may be maintained at the initial position due to the elastic forces of the springs S1 and S2 connected to the actuating ring 150. The knob ring 120 maintained at the initial position may be rotated at a predetermined angle clockwise or counterclockwise, and when an external force is released while the knob ring 120 is rotated, the knob ring 120 may be returned to its original or initial position due to restoration forces provided by the springs S1 and S2.

For example, when the knob ring 120 is manipulated counterclockwise, the first spring S1, elongated due to rotation of the knob ring 120, may provide a restoration force to return the knob ring 120 to the initial position, and when the knob ring 120 is manipulated clockwise, the second spring S2, elongated due to rotation of the knob ring 120, may provide a restoration force to return the knob ring 120 to the initial position.

Figure 6:
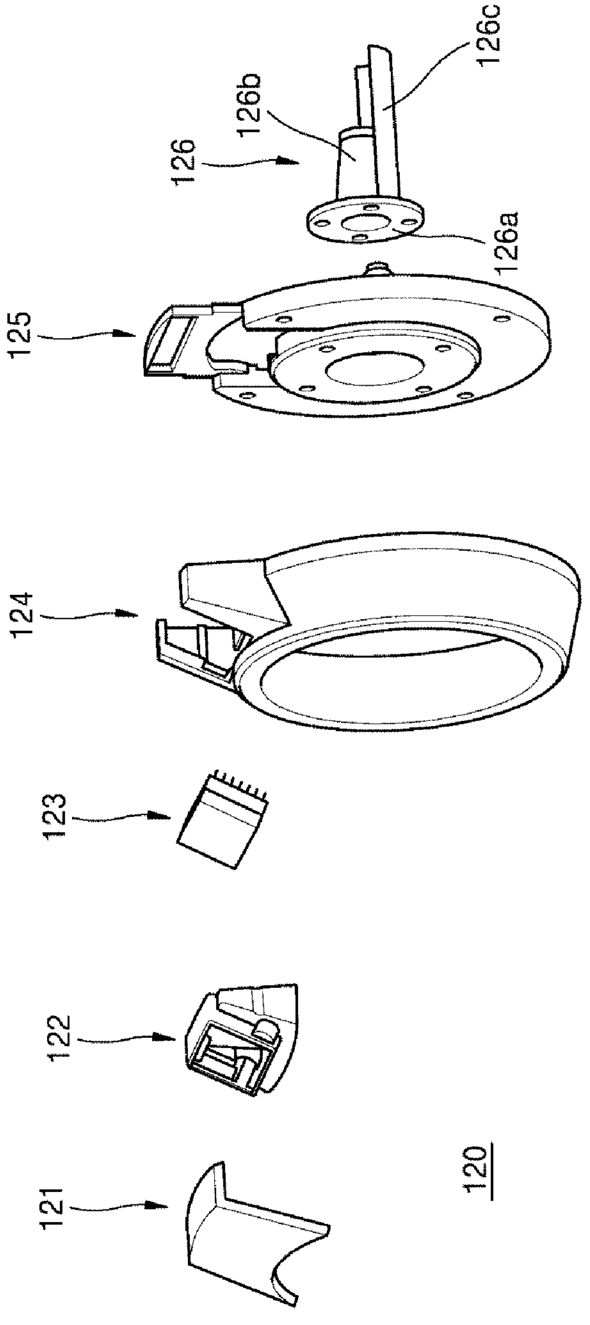
FIG. 6 is an exploded perspective view of a knob ring according to an embodiment.
Figure 7:
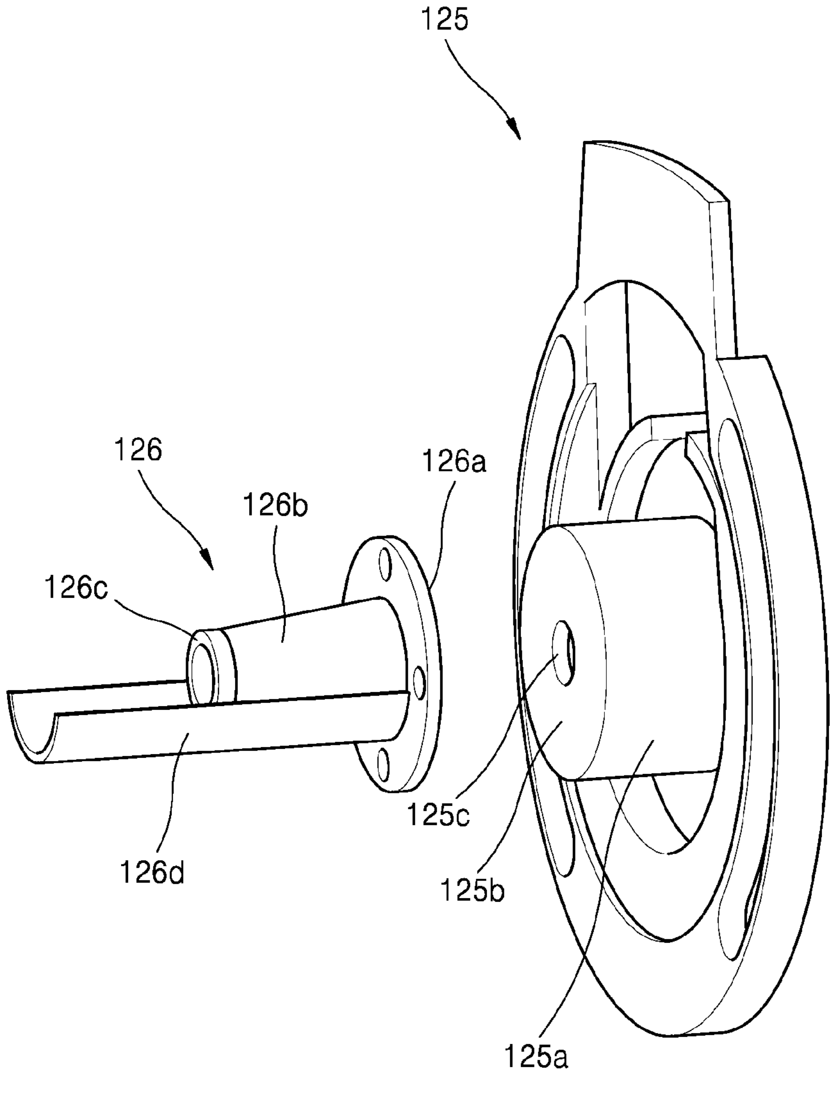
FIG. 7 is a rear perspective view of rear surfaces of some components of the knob ring of FIG. 6.

Referring to FIG. 6 and FIG. 7, the knob ring 120 may include a knob ring main body 124, a rear plate 125, and a support tube 126. The knob ring main body 124 may form an exterior of the knob ring 120. For example, the knob ring main body 124 may be formed in a ring shape. The rear plate 125 may be formed in a disc shape and may be coupled to a rear surface of the knob ring main body 124. The rear plate 125 may include a support plate 125*b* that enters the front panel c (see FIG. 3) and protrudes toward an inner portion of the cooking appliance. Further, a support hole 125*c* configured to form a path for the adjusting shaft 194 (see FIG. 3) to pass through the knob ring 120, and support the adjusting shaft 194 may be provided in the support plate 125*b*.

The support tube 126 provided to support the adjusting shaft 194 may be coupled to the rear plate 125. The support tube 126 may include a flange 126*a* coupled to the rear plate 125, a tapered tube 126*b* extending from the flange 126*a*, and a support rib 126*d* extending further than the tapered tube 126*b*. The tapered tube 126*b* may have a tapered shape in which a diameter thereof may become narrower away from the flange 126*a*, and may include a support or cap 126*c* provided at an end thereof and configured to support the adjusting shaft 194. In the knob ring 120, a two-point support structure in which the adjusting shaft 194 may be supported at the support hole 125*c* and the cap 126*c* may be provided.

Because the adjusting shaft 194 may be installed to be movable by the valve assembly 190 (see FIG. 3) provided in the form of a flexible valve instead of being restricted to a predetermined position as in the related art, a structure capable of stably supporting the adjusting shaft 194 may be necessary. For this, the two-point support structure in which the adjusting shaft 194 is supported at the support hole 125*c* and the cap 126*c* may be provided by the knob ring 120 such that the adjusting shaft 194 may be stably supported.

In addition to the support structure configured to support the adjusting shaft 194 at two or more points, the knob ring 120 may also provide a support structure capable of supporting a front end of the gear G1 (see FIG. 4) coupled to the adjusting shaft 194. The gear G1 may be provided to transmit or transfer a rotational amount of the adjusting shaft 194 to the knob encoder E1 (see FIG. 4), and may be supported by being mounted on the support rib 126*d*.

The display 123 that displays heating power or timer time may be provided at the knob ring 120. The display 123 may be coupled to the knob ring main body 124 via a display housing 122, and a finishing cap 121 may be coupled to an outer portion of the display 123. The finishing cap 121 may be formed with a transparent or translucent material to allow information displayed on the display 123 to be viewed from the outside.

Figure 4:
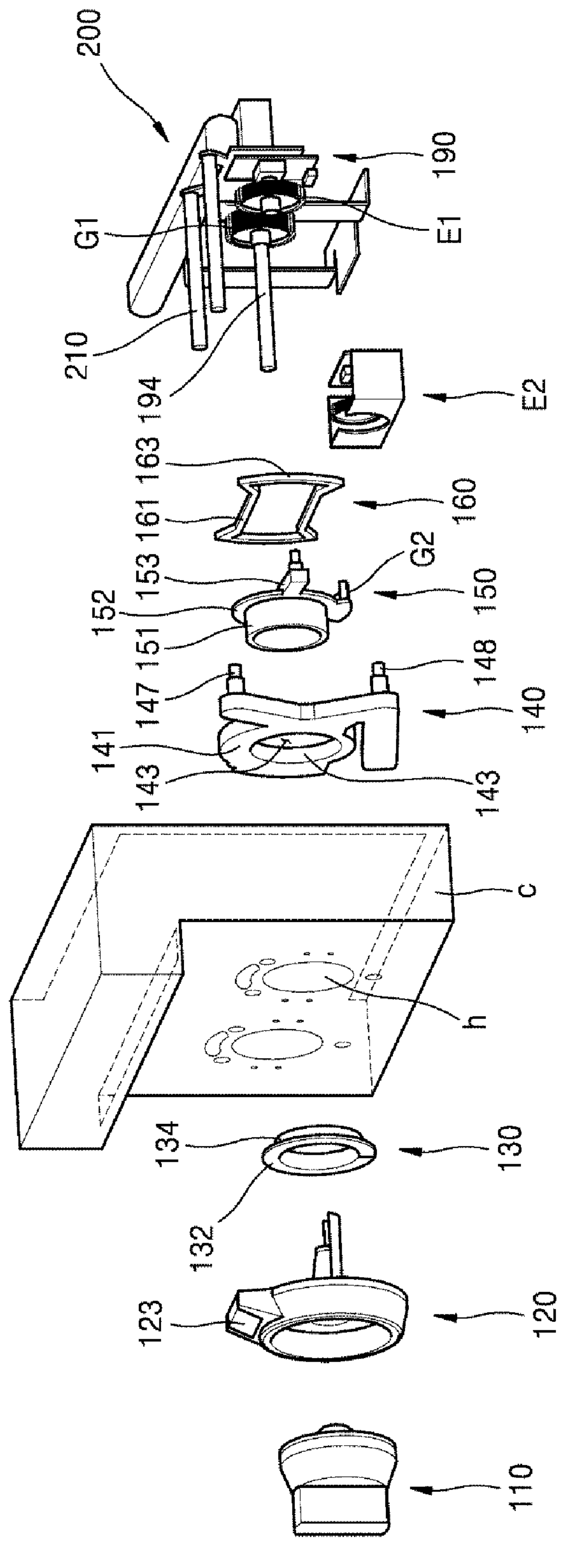
FIG. 4 is an exploded perspective view of the knob assembly of FIG. 2.

As illustrated in FIG. 4, the knob assembly may be provided so that a heating power may be adjusted by manipulation of the knob 110 and time of a timer may be displayed by manipulation of the knob ring 120. For this, the knob assembly may include the display 123 provided at the knob ring 120, the knob encoder E1 configured to sense a manipulation state of the knob 110, and the knob ring encoder E2 (see FIG. 5) configured to sense manipulation of the knob ring 120.

Figure 5:
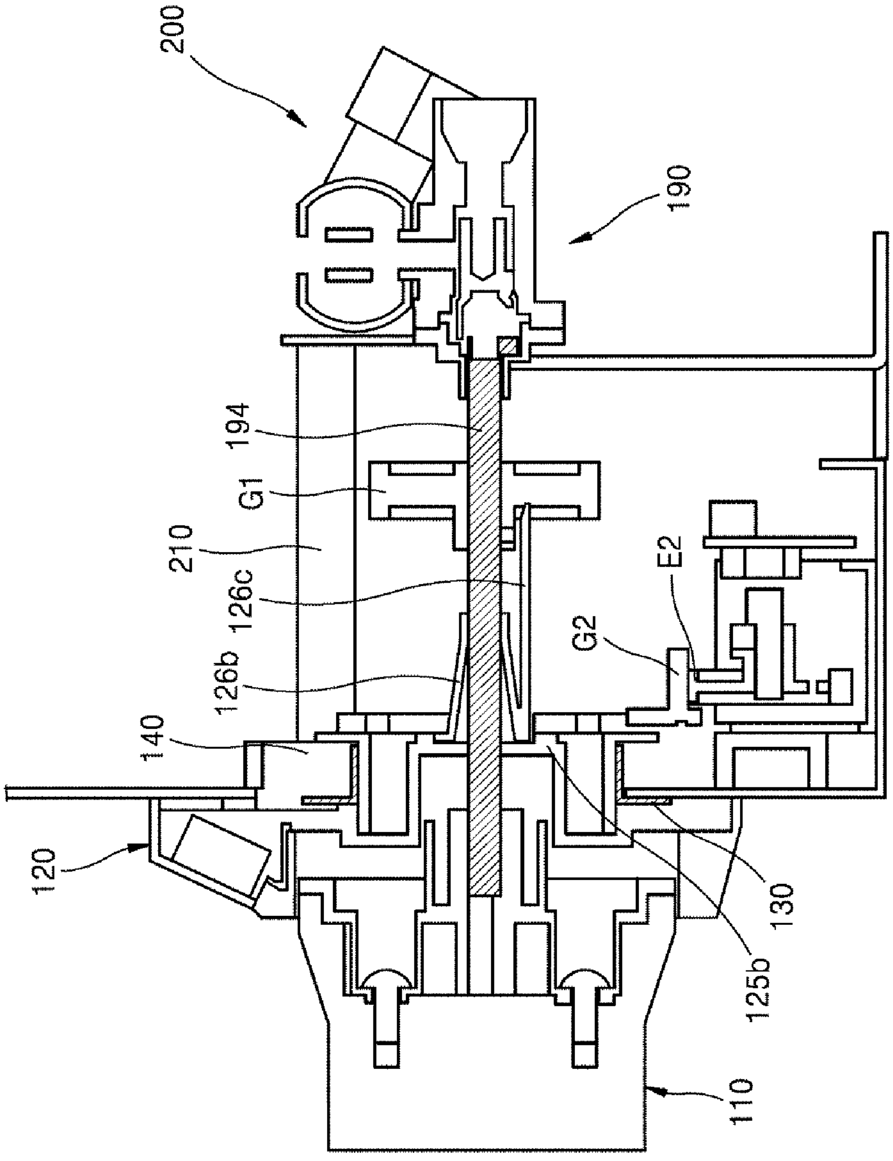
FIG. 5 is a cross-sectional view of the coupling state of the knob assembly of FIG. 2.
Figure 8:
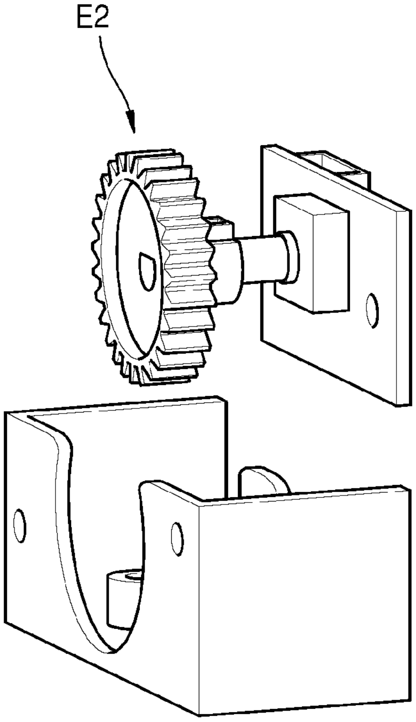
FIG. 8 is a view of a knob ring encoder according to an embodiment.

Referring to FIG. 5 and FIG. 8, the knob ring encoder E2 may engage with the knob ring gear G2 of the actuating ring 150 and may be rotated by engaging with the knob ring gear G2, which may be rotated by interlocking with rotation of the actuating ring 150, thereby sensing rotation of the actuating ring 150.

The knob ring 120 may be provided in the form of a return-type rotary switch. The knob ring 120 may be rotated within a predetermined range when an external force is applied thereto in a rotating direction and may be returned to its original or initial position when the external force is released. For example, the knob ring 120 may be manipulated such that time of a timer is increased when the knob ring 120 is rotated by a predetermined angle clockwise and time of the timer is decreased when the knob ring 120 is rotated by a predetermined angle counterclockwise.

Figure 9:
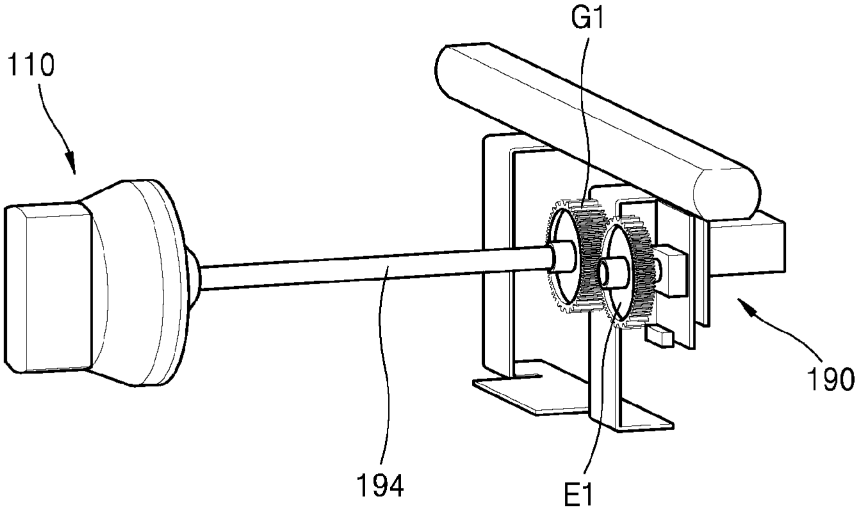
FIG. 9 is a view of a knob encoder according to an embodiment.

Referring to FIG. 4 and FIG. 9, the knob 110 may be connected to the adjusting shaft 194 of the valve assembly 190. The knob encoder E1 may engage with the gear G1 coupled to the adjusting shaft 194 and may be rotated by engaging with the gear G1, which may be rotated by interlocking with rotation of the adjusting shaft 194, thereby sensing rotation of the adjusting shaft 194.

The knob 110 may be provided in the form of a no-return type rotary switch. The knob encoder E1 may sense rotation of the knob 110 by a method of sensing rotation of the adjusting shaft 194, which may be integrally rotated with the knob 110, and may sense a rotational amount or manipulation angle of the knob 110 manipulated from its initial position. As the valve assembly 190 may be configured with variable resistance in a cooking appliance in which a heating power may be electrically adjusted, such as, for example, an electric stove or an induction stove, a state of the valve assembly 190 may also be sensed without the knob encoder E1 being separately provided.

Figure 10:
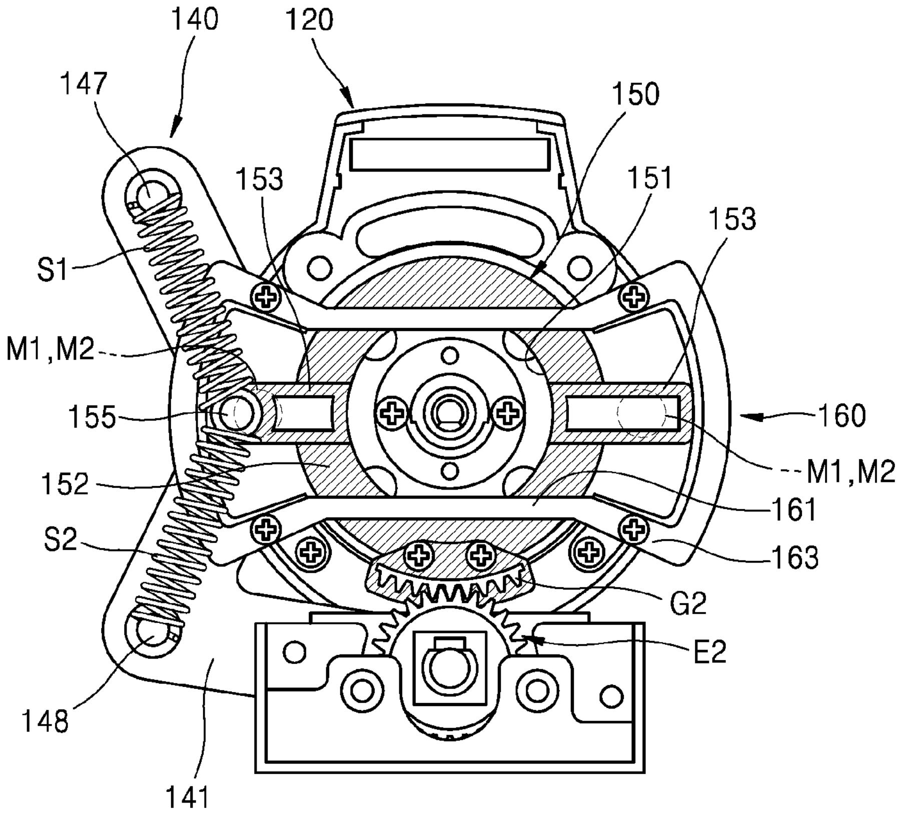
FIG. 10 is a rear view showing an assembly structure of the knob assembly of FIG. 2.
Figure 11:
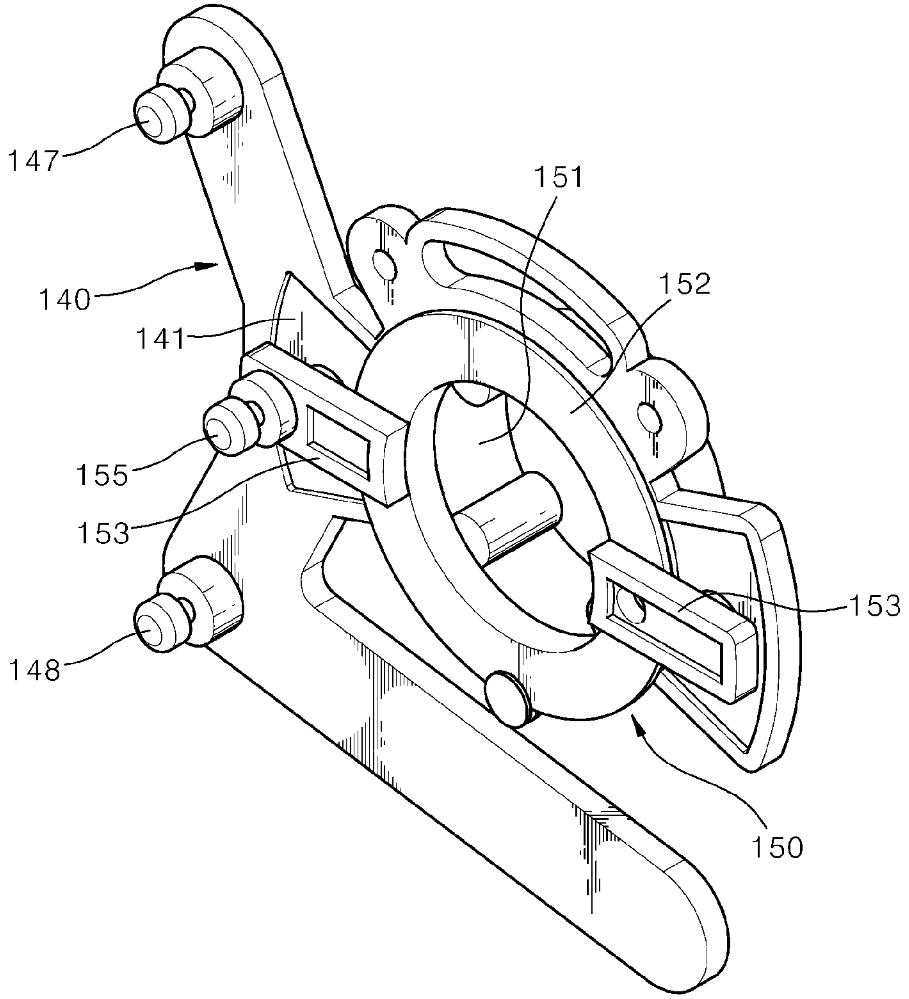
FIG. 11 is a perspective view of a support frame and an actuating ring of the knob assembly of FIG. 10.
Figure 12:
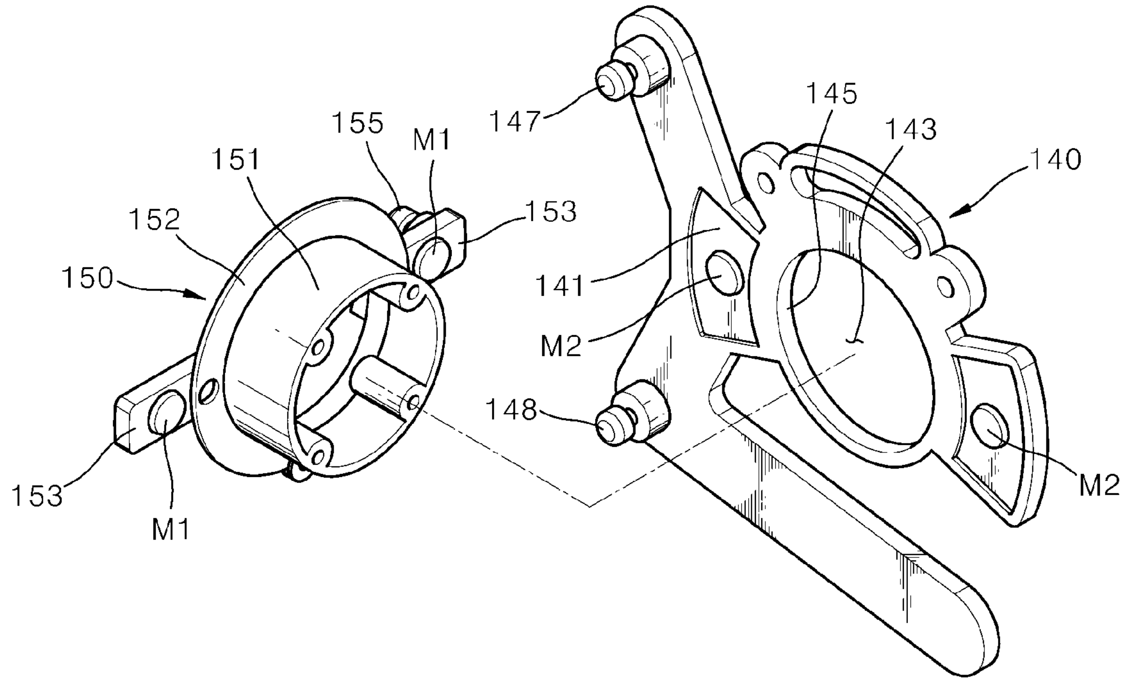
FIG. 12 is an exploded perspective view of the support frame and the actuating ring of FIG. 11.

FIG. 10 is a rear view of an assembly structure of the knob assembly, FIG. 11 is a perspective view in which the support frame and the actuating ring of the knob assembly of FIG. 10 are separately illustrated, and FIG. 12 is an exploded perspective view of the support frame and the actuating ring illustrated in FIG. 11. For convenience of illustration, the front panel c has been omitted in FIG. 10 to FIG. 12.

Figure 3:
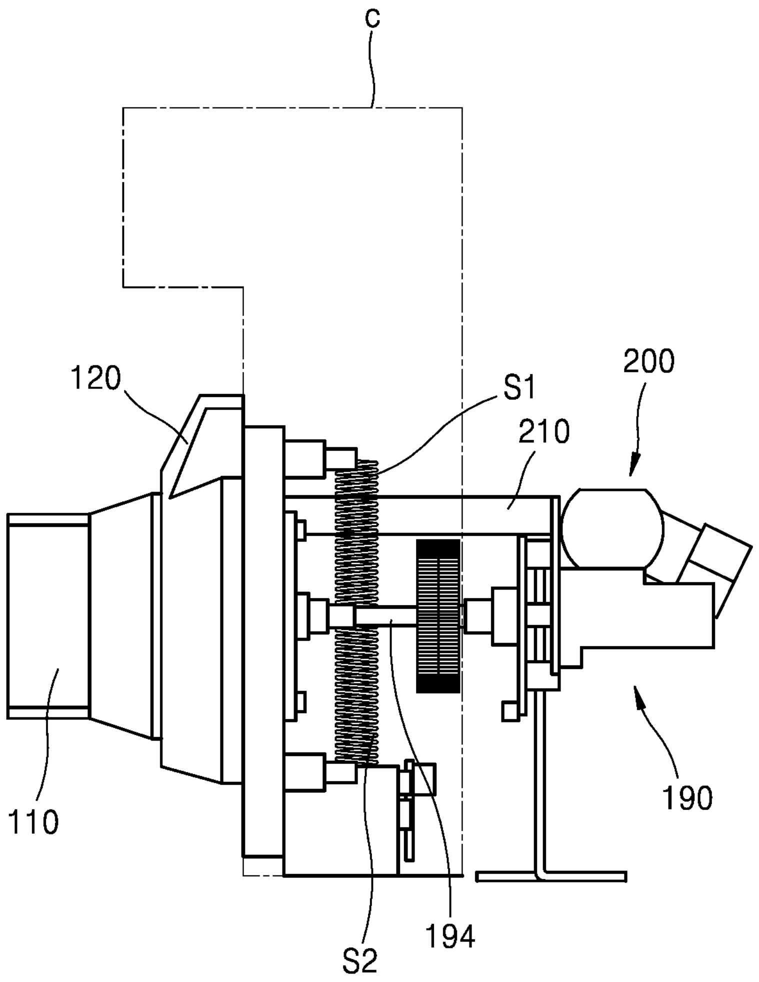
FIG. 3 is a side view of a coupling state of the knob assembly of FIG. 2.

Referring to FIG. 3 and FIG. 10, the knob 110 and the knob ring 120 may be coupled to the front or first side of the front panel c, and the support frame 140, the actuating ring 150, and the fixing frame 160 may be coupled to the rear or second side of the front panel c. The fixing frame 160 may be fastened to the rear or second surface of the front panel c, and the actuating ring 150 may be fastened to the knob ring 120 via the front panel c. A center of rotation of the actuating ring 150 may coincide with a center of rotation of the knob 110. The actuating ring 150 may restrict the center of rotation of the knob 110 to be at a regular or correct position with respect to the front panel c. That is, when the actuating ring 150 is fixed at a regular position with respect to the front panel c, by this, the knob 110 may be fixed at an accurate or correct position with respect to the front panel c.

The actuating ring 150 may be inserted into the support frame 140, and a portion thereof may pass through the front panel c and protrude from the front or first surface of the front panel c. A front or first end of the actuating ring 150 may be formed in a cylindrical shape, and the cylindrical first end may protrude from the front or first surface of the front panel c. The knob ring 120 may be coupled to the cylindrical first end of the actuating ring 150 protruding from the front or first surface of the front panel c. By the knob ring 120 being coupled to the actuating ring 150 supported by the support frame 140, a support structure in which the knob ring 120 is supported by the support frame 140 may be formed.

Manipulation of the knob ring 120 may be recognized by rotation of the actuating ring 150, which may be rotated by being interlocked with rotation of the knob ring 120. As the knob ring 120 is a portion exposed to or provided at the outside of the front panel c, it may not be desirable in terms of appearance for the knob ring encoder E2, configured to sense manipulation of the knob ring 120, to be installed around the knob ring 120 outside the front panel c. In consideration of such an aspect, the knob ring encoder E2 may be installed around the actuating ring 150, which may be the inside of the front panel c, and the knob ring encoder E2 may sense rotation of the knob ring 120 by sensing rotation of the actuating ring 150 inside the front panel c.

In the actuating ring 150, the knob ring gear G2 configured to transmit or transfer an angle of rotation of the actuating ring 150 may be provided. The knob assembly may further include the knob ring encoder E2, and the knob ring encoder E2 may engage with the knob ring gear G2 and may read a rotation or manipulation signal of the knob ring 120.

The fixing frame 160 configured to prevent the actuating ring 150 from being deviated rearward and allow the actuating ring 150 to be stably operated may be included. The fixing frame 160 may be provided to cross the rear or second surface of the actuating ring 150 and may be fixed to the support frame 140. The fixing frame 160 may prevent the actuating ring 150 from being deviated rearward and may limit the rotation range of the actuating ring 150 within a designated or predetermined range.

The actuating ring 150 may include a wing 153 formed to extend sideward from a center of the actuating ring 150, and the wing 153 may be inserted into the fixing frame 160. The wing 153 inserted into the fixing frame 160 may move within a movement-possible region or movement range inside the fixing frame 160, and movement thereof may be limited from a point interfering with the upper inner wall or the lower inner wall of the fixing frame 160. When the movement range of the wing 153 is limited by the fixing frame 160, an angle of rotation in both directions of the actuating ring 150 may be limited to the predetermined range. By applying a structure in which the wing 153 is provided at each of both sides of the actuating ring 150, and movement ranges of the wings 153 are limited at a same position, the rotation range of the actuating ring 150 may be more stably limited.

The actuating ring 150 may be connected to the springs S1 and S2 configured to provide an elastic force to return the actuating ring 150, which may be rotated to a position spaced apart from an initial position, to the initial position. Because the actuating ring 150 and the knob ring 120 are integrally rotated, the knob ring 120 may be maintained at its initial position due to elastic forces of the springs S1 and S2 connected to the actuating ring 150. The knob ring 120 maintained at the initial position may be rotated at a predetermined angle clockwise or counterclockwise, and when an external force is released while the knob ring 120 is rotated, the knob ring 120 may be returned to the initial position due to restoration forces provided by the springs S1 and S2.

For example, when the actuating ring 150 is rotated counterclockwise due to manipulation of the knob ring 120, the first spring S1 may provide an elastic force acting clockwise for the actuating ring 150 to be returned to the initial position. When the actuating ring 150 is rotated clockwise due to manipulation of the knob ring 120, the second spring S2 may provide an elastic force acting counterclockwise for the actuating ring 150 to be returned to the initial position.

For the actuating ring 150, which is rotated to a position spaced apart from an initial position, to be accurately returned to the initial position, tolerances of the springs S1 and S2 may need to be managed with high precision. For example, for the actuating ring 150 to be accurately returned to the initial position, the first spring S1 and the second spring S2 may need to be able to provide a same level or amount of elastic force.

However, it may be difficult for a coil spring forming the first spring S1 and a coil spring forming the second spring S2 to have the same elastic force. Even when the springs S1 and S2 are configured using the pair of coil springs having the same elastic force, a case in which a difference may be generated between the elastic forces of the first spring S1 and the second spring S2 due to tolerances generated in the processes of installing the springs S1 and S2 may occur.

When a difference is generated between the elastic forces of the first spring S1 and the second spring S2, the actuating ring 150 may be unable to the accurately returned to the initial position. That is, a deviation may occur between return positions of the actuating ring 150 and the knob ring 120 connected thereto due to the difference between the elastic forces of the first spring S1 and the second spring S2.

Even when there is no difference between elastic forces of the first spring S1 and the second spring S2, a deviation may occur between return positions of the actuating ring 150 and the knob ring 120 connected thereto due to friction deviation in accordance with rotary positions of the actuating ring 150 and the support frame 140. That is, a deviation in return positions of the actuating ring 150 and the knob ring 120 connected thereto, which may cause an exterior defect of an appliance, may occur due to various reasons.

To solve such a problem, as illustrated in FIG. 10 to FIG. 12, the knob assembly may further include magnetic force providing parts or providers M1 and M2 configured to provide magnetic forces to move the knob ring 120, which may be adjacent or close to its initial position, back to the initial position.

The magnetic force providers M1 and M2 may include a first magnetic member or magnet M1 provided at the actuating ring 150 and a second magnetic member or magnet M2 provided at the support frame 140. For example, the first magnet M1 may be provided at the wing 153 of the actuating ring 150, and the second magnet M2 may be provided at the frame main body 141 of the support frame 140.

A pair of first magnets M1 provided at the actuating ring 150 may be respectively provided at a pair of wings 153. A number of second magnets M2 provided at the support frame 140 may correspond to a number of first magnets M1, and the second magnets M2 may be spaced apart from each other by a predetermined distance between the pair of first magnets M1. The first magnet M1 may be provided at one or a first side surface of the wing 153 facing the frame main body 141, and the second magnet M2 may be provided at one or a second side surface of the frame main body 141 facing the wing 153.

The first magnet M1 and the second magnet M2 may be magnets provided so that different poles face each other. The first magnet M1 and the second magnet M2 may be attracted to each other by a magnetic force. A position of the knob ring 120 may be maintained at the initial position when a distance between the first magnet M1 and the second magnet M2 is small. That is, the position of the knob ring 120 may be maintained at the initial position when the first magnet M1 and the second magnet M2 are adjacent or close to each other so as to be attracted to each other by a magnetic force.

Figure 13:
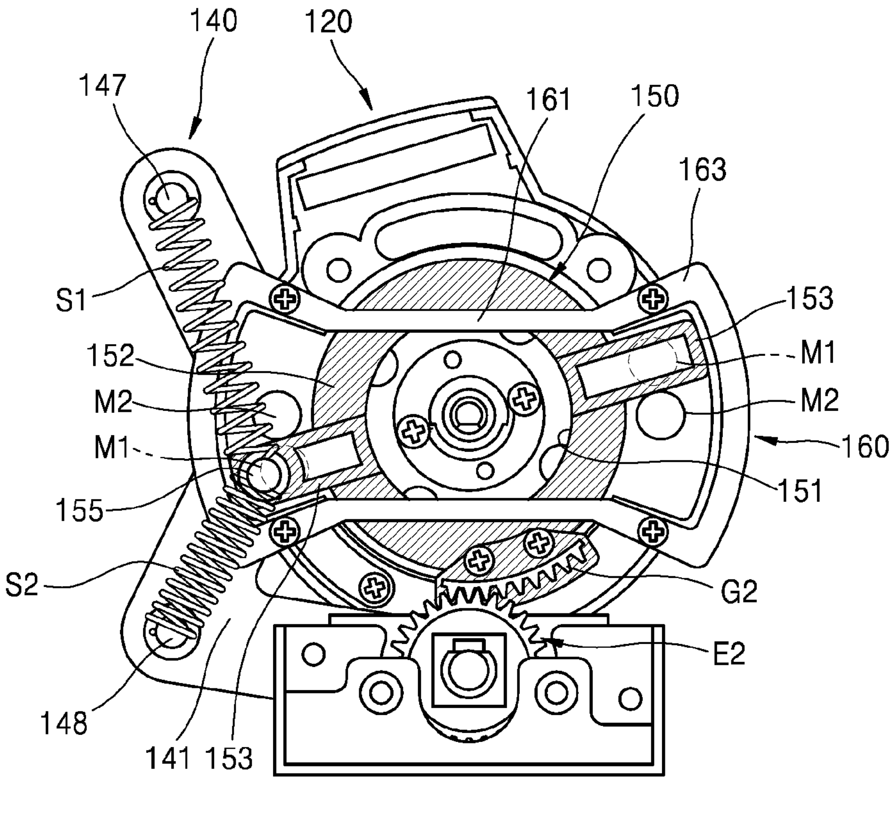
FIG. 13 is a view of a manipulation state of a knob ring of the knob assembly of FIG. 10.

Actions of the springs S1, S2 and the magnetic force providers M1, M2 to return the knob ring 120 to its initial position are described with reference to FIG. 13 to FIG. 18. Referring to FIG. 13, when the actuating ring 150 is rotated counterclockwise due to manipulation of the knob ring 120, the pair of wings 153 provided at the actuating ring 150 may also be rotated counterclockwise. The wings 153 may move within the movement-possible region inside the wing insertion portion 163, and movement thereof may be limited from the point interfering with the upper inner wall or the lower inner wall of the wing insertion portion 163. From the point at which movement of the wings 153 is limited, further rotation of the actuating ring 150 may also be limited.

Figure 14:
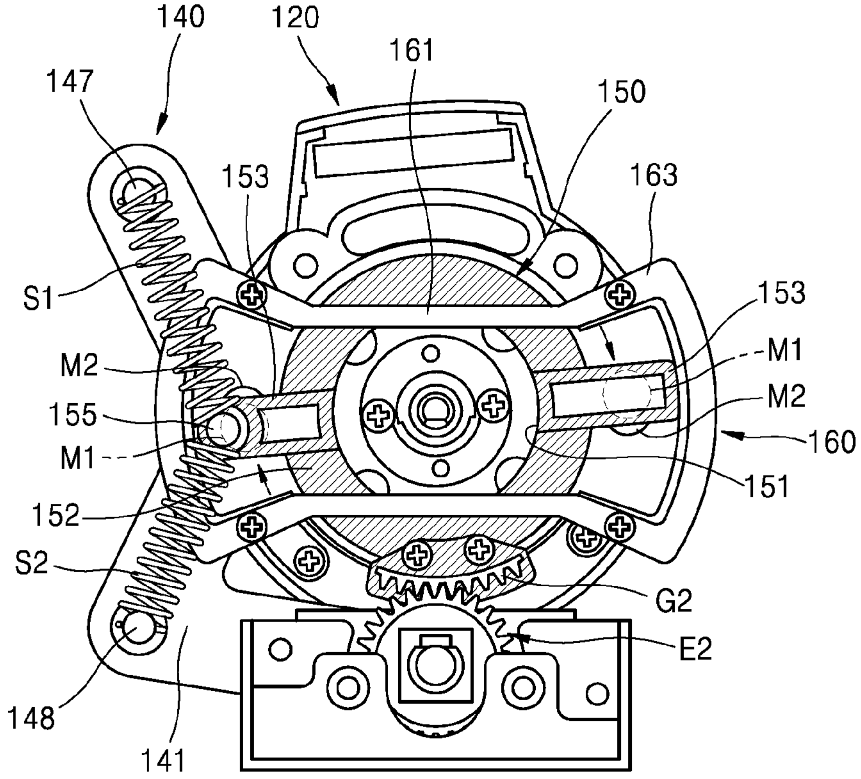
FIG. 14 and FIG. 15 are views showing a process in which the actuating ring of FIG. 13 is returned to its original position.

In this case, the wing 153 coupled to the springs S1 and S2 of the pair of wings 153 may be moved toward the lower inner wall. Accordingly, an interval between the wing-side coupler 155 and the first frame-side coupler 147 may be widened, and the first spring S1 may be elongated. When the external force that rotated the knob ring 120 is released, the first spring S1, which is elongated, may provide an elastic force acting clockwise to the actuating ring 150. Accordingly, as illustrated in FIG. 14, the actuating ring 150 may return to the initial position.

Figure 15:
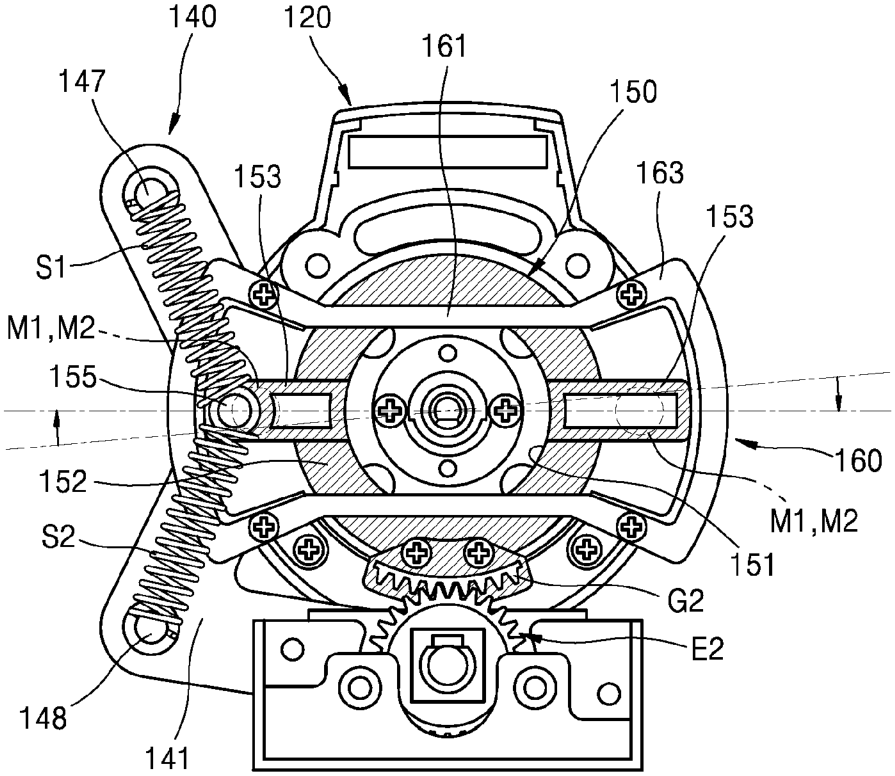

When the actuating ring 150 is rotated up to a position at which the first magnet M1 and the second magnet M2 are in the vicinity of each other within a range such that the first magnet M1 and the second magnet M2 are attracted to each other via the magnetic attractive force (hereinafter referred to as "attractive force acting range"), the magnetic attractive force acts between the first magnet M1 to the second magnet M2 and attracts the first magnet M1 to the second magnet M2. Therefore, even when the action of the elastic force provided by the first spring S1 does not succeed in accurately moving the actuating ring 150 to the initial position, and the actuating ring 150 is provided at a spot somewhat deviated or apart from the initial position, when the spot is in a position within the attractive force acting range, the position of the actuating ring 150 may be adjusted by the magnetic attractive force between the first magnet M1 and the second magnet M2 as illustrated in FIG. 15.

Within the attractive force acting range, the position of the actuating ring 150 may be changed to a spot at which the distance between the first magnet M1 and the second magnet M2 may be the smallest. Since positions of the actuating ring 150 and the knob ring 120 connected thereto may be set or predetermined to be maintained at initial positions when the distance between the first magnet M1 and the second magnet M2 is the smallest, the knob ring 120 may be accurately moved to the initial position by magnetic forces provided by the magnetic force providers M1 and M2 when the actuating ring 150 is located within the attractive force acting range.

That is, the springs S1 and S2 may return the actuating ring 150, which is rotated to a position deviated or apart from an initial position, and the knob ring 120 connected thereto to be within the attractive force acting range, for example, within ±2° from the initial position. Then, the magnetic force providers M1 and M2 may serve to accurately align the actuating ring 150 and the knob ring 120 connected thereto, which are within the attractive force acting range, to their initial positions.

By the above-described springs S1, S2 and magnetic force providers M1, M2, deviation between return positions of the actuating ring 150 and the knob ring 120 connected thereto may be prevented, and in this way, an exterior defect of an appliance caused by a return failure of the knob ring 120 may be effectively prevented.

When attempting to rotate the knob ring 120 while the positions of the knob ring 120 is maintained at the initial position due to the magnetic force providers M1 and M2 as described above, a force larger than the magnetic attractive force acting between the first magnet M1 and the second magnet M2 may be required in comparison to when the magnetic force providers M1 and M2 are not included. That is, as the knob ring 120 may be rotated only when a force of a predetermined magnitude or greater than the magnetic force is applied thereto, erroneous manipulation of the knob ring 120 may be prevented, and a user to may easily recognize a start of rotation of the knob ring 120.

Figure 16:
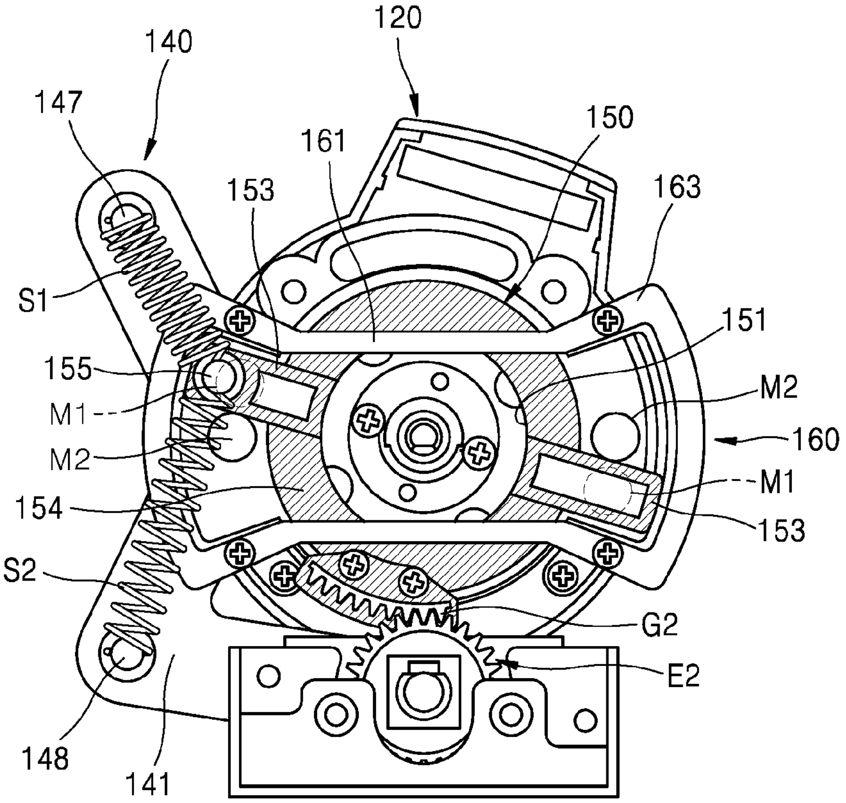
FIG. 16 is a view of a manipulation state of the knob ring of the knob assembly of FIG. 10.

As illustrated in FIG. 16, when the actuating ring 150 is rotated clockwise by manipulation of the knob ring 120, the pair of wings 153 provided at the actuating ring 150 may also be rotated clockwise. In this case, the wing 153 coupled to the springs S1 and S2 of the pair of wings 153 may be moved toward the upper inner wall. Accordingly, an interval between the wing-side coupler 155 and the second frame-side coupler 148 may be widened, and the second spring S2 may be elongated.

Figure 17:
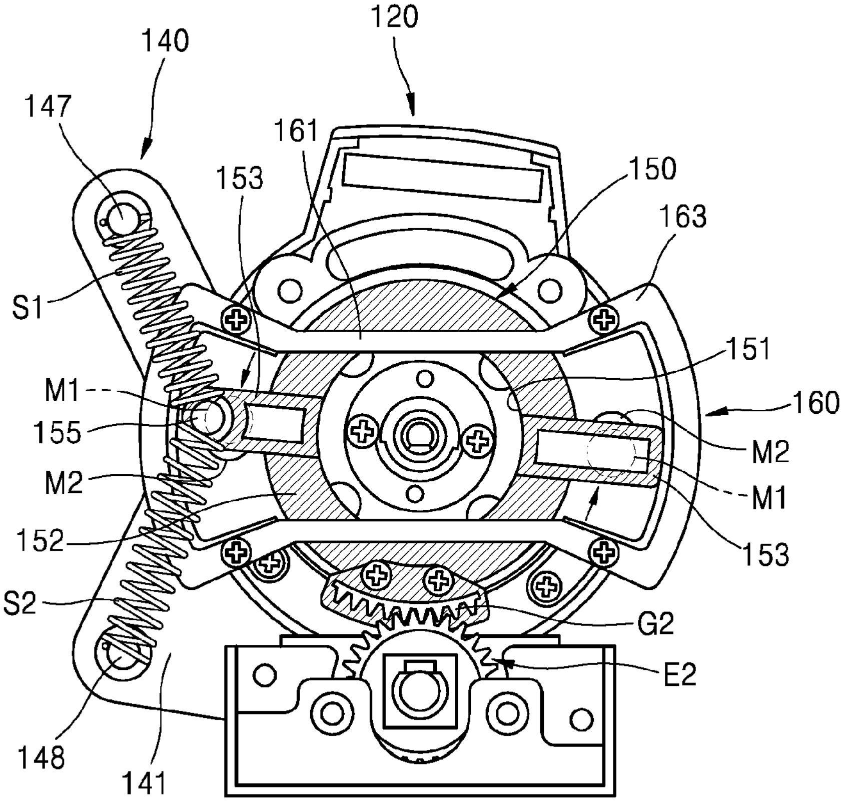
FIG. 17 and FIG. 18 are views showing a process in which the actuating ring of FIG. 15 is returned to its original position.

In such a state, when the external force that rotated the knob ring 120 is released, the second spring S2, which is elongated, may provide an elastic force acting counterclockwise to the actuating ring 150. Accordingly, as illustrated in FIG. 17, the actuating ring 150 may return to its initial position. When the actuating ring 150 is rotated up to a position at which the first magnet M1 and the second magnet M2 are in the vicinity of each other within the attractive force acting range, the magnetic force acts between the first magnet M1 and the second magnet M2 and the first magnet M1 and the second magnet M2 are attracted to each other.

Figure 18:
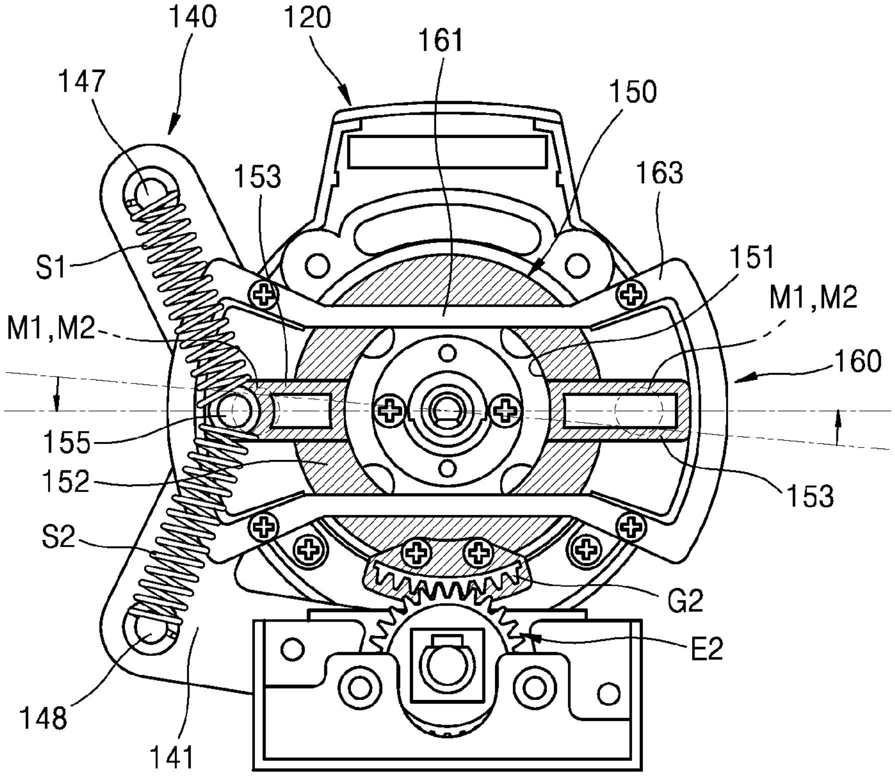

Therefore, even when the elastic force provided by the second spring S2 does not succeed in accurately moving the actuating ring 150 to its initial position, and the actuating ring 150 is provided at a spot somewhat deviated or apart from the initial position, when the spot is a position within the attractive force acting range, the position of the actuating ring 150 may be adjusted by the magnetic attractive force acted between the first magnet M1 and the second magnet M2 as illustrated in FIG. 18. Accordingly, the knob ring 120 may be accurately adjusted to be moved to the initial position.

According to embodiments disclosed herein, an independent manipulation switch whose function and shape may be different from those of a conventional knob ring may be provided using a knob ring installed to finish a knob. In this way, a user may easily select a manipulation switch suitable for a certain purpose such that convenience in use may be improved, and a number of manipulation switches provided at a front surface of the appliance may be decreased such that an appearance of the front surface of the appliance may be improved.

Further, an occurrence of deviation in a return position of a knob ring provided as an independent manipulation switch may be prevented, and an occurrence of an exterior defect of an appliance caused by a return failure of the knob ring may be effectively prevented. As a knob ring may be rotated only when a force of a predetermined magnitude or greater than a magnetic force holding the knob ring in place is applied thereto, erroneous manipulation of the knob ring may be prevented, and a user may be able to easily recognize a start of rotation of the knob ring.

According to embodiments disclosed herein, a knob assembly may include a knob installed to be rotatable at a front panel, a knob ring installed at the front panel to surround the knob and be rotated independently from the knob, an spring configured to provide a force for returning the knob ring, which is rotated to a position spaced apart from an initial position, toward the initial position, and a magnetic force provider configured to provide a magnetic force for moving the knob ring, which is moved to a position adjacent to the initial position, to the initial position. The knob assembly may further include an actuating ring coupled to the knob ring to be rotated by interlocking with rotation of the knob ring, and a support frame coupled to the front panel to rotatably support the actuating ring.

The magnetic force provider may include a first magnet provided at the actuating ring and a second magnet provided at the support frame. A magnetic attractive force for attracting each other may be acted between the first magnet and the second magnet, and a position of the knob ring may be maintained at the initial position when a distance between the first magnet and the second magnet is the smallest. The position of the knob ring 1 may be maintained at the initial position when the first magnet and the second magnet are adjacent or close to each other so as to be attracted to each other by a magnetic force The first magnet and the second magnet may magnets provided so that different poles face each other.

The actuating ring may include a coupling shaft coupled to the knob ring and passing through the support frame to rotatably support the support frame, and a wing extending to protrude from an outer peripheral surface of the coupling shaft. The support frame may include a frame main body coupled to a rear side of the front panel, a through-hole formed to pass through an inside of the frame main body and forming a path for the coupling shaft to pass through the support frame, and a support forming a sidewall configured to rotatably support the coupling shaft around the through-hole. The first magnet may be provided at one side surface of the wing facing the frame main body, and the second magnet may be provided at one side surface of the frame main body facing the wing.

The spring may include a coil spring having one longitudinal side coupled to the wing and the other longitudinal side coupled to the support frame, the wing may include a wing-side coupler to which the one longitudinal side of the spring is coupled, and the support frame may include a frame-side coupler to which the other longitudinal side of the spring is coupled. When the knob ring is rotated to a position spaced apart from the initial position, an interval between the wing-side coupler and the frame-side coupler may be widened such that the spring is elongated, and an elastic restoration force generated from the elongated spring may act as a force for rotating the knob ring toward the initial position.

The spring may include a first spring configured to provide a force for rotating the knob ring, which is rotated in one direction from the initial position, toward the initial position, and a second spring configured to provide a force for rotating the knob ring, which is rotated in the other direction from the initial position, toward the initial position. The frame-side coupler may include a first frame-side coupler provided above the wing-side coupler and having the first spring coupled thereto and a second frame-side coupler provided below the wing-side coupler and having the second spring coupled thereto.

The knob assembly may further include a fixing frame installed at a rear side of the front panel and configured to restrict a position of the actuating ring in frontward and rearward directions. The fixing frame may include a fixing portion coupled to the support frame and configured to support the actuating ring in a direction in which the wing is adhered to the frame main body, and a wing insertion portion inserted to allow the wing to be rotated within a predetermined angle range. The knob assembly may further include a knob ring encoder configured to sense rotation of the knob ring.

According to embodiments disclosed herein, an appliance may include a knob assembly including a knob installed to be rotatable at a front panel, a knob ring installed at the front panel to surround the knob and be rotated independently from the knob, an spring configured to provide a force for returning the knob ring, which is rotated to a position spaced apart from an initial position, toward the initial position, and a magnetic force provider configured to provide a magnetic force for moving the knob ring, which is moved to a position adjacent to the initial position, to the initial position.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A knob assembly, comprising:

a knob ring configured to be rotatable at a front of a front panel;

a support frame attached to a rear of the front panel;

an actuating ring provided at the rear of the front panel, and coupled to the knob ring through the front panel to be rotated by interlocking with rotation of the knob ring; and a fixing frame coupled to the support frame at a rear of the support frame, wherein the fixing frame includes a fixing portion provided at a rear of the actuating ring, and wherein the actuating ring includes a coupling shaft that passes through a through-hole of the support frame corresponding to an outer diameter of the coupling shaft and is rotatably supported by the support frame.

2. The knob assembly of claim 1, wherein the actuating ring further includes a flange that radially protrudes outward from a rear of the coupling shaft that passes through the through-hole.

3. The knob assembly of claim 1, wherein the actuating ring further includes a wing and the fixing frame further includes a wing insertion portion to which the wing is inserted to be rotated within a predetermined angle range.

4. The knob assembly of claim 1, wherein the actuating ring further includes a wing that extends radially outward from a rear of the coupling shaft that passes through the through-hole.

5. The knob assembly of claim 4, wherein at least one spring connected to the support frame and the wing and configured to provide an elastic force when the knob ring is rotated in one of a clockwise or counterclockwise direction from an initial position so as to return the knob ring toward the initial position when an external force is released.

6. The knob assembly of claim 5, further comprising a fixing frame coupled to the support frame at a rear of the support frame, wherein the fixing frame includes a wing insertion portion to which the wing is inserted to be rotated within a predetermined angle range.

7. The knob assembly of claim 4, further comprising at least one magnet provided on at least one of the support frame or the wing and configured to provide a magnetic force that returns the knob ring to the initial position.

8. The knob assembly of claim 7, wherein:

the at least one magnet includes a first magnet provided at the wing and a second magnet provided at the support frame;

the first magnet and the second magnet are attracted to each other by a magnetic attractive force; and a position of the knob ring is maintained at the initial position when a distance between the first magnet and the second magnet is the smallest.

9. The knob assembly of claim 1, wherein the support frame is non-rotatably attached to the front panel.

10. The knob assembly of claim 1, further comprising a knob ring encoder configured to sense rotation of the knob ring, wherein the knob ring encoder is installed at the support frame.

11. The knob assembly of claim 1, further comprising a knob surrounded by the knob ring at the front of the front panel and configured to be rotated independently from the knob ring.

12. The knob assembly of claim 11, wherein the knob is connected to an adjusting shaft, and the knob ring includes a support tube that rotatably supports the adjusting shaft.

13. The knob assembly of claim 11, wherein the knob is in a form of a no-return type rotary switch.

14. An appliance including the knob assembly according to claim 1.

15. A cooking appliance, comprising:

a front panel; and at least one knob configured to be rotatable at a first side of the front panel;

at least one knob ring provided at the first side of the front panel and configured to surround the at least one knob so as to be rotated independently from the at least one knob;

an actuating ring provided at a second side of the front panel and coupled to the knob ring through the front panel to be rotated by interlocking with rotation of the knob ring;

a support frame provided at the second side of the front panel, configured to rotatably support the actuating ring, and coupled to the front panel at the second side of the front panel; and a fixing frame coupled to the support frame at a rear of the support frame, wherein the fixing frame includes a fixing portion provided at a rear of the actuating ring, and wherein the actuating ring includes a coupling shaft that passes through a through-hole of the support frame corresponding to an outer diameter of the coupling shaft.

16. The cooking appliance of claim 15, wherein the actuating ring further includes a flange that radially protrudes outward from a rear of the coupling shaft that passes through the through-hole.

17. The cooking appliance of claim 15, wherein the actuating ring further includes a wing and the fixing frame further includes a wing insertion portion to which the wing is inserted to be rotated within a predetermined angle range.

18. The cooking appliance of claim 17, wherein at least one spring connected to the support frame and the wing and configured to provide an elastic force when the knob ring is rotated in one of a clockwise or counterclockwise direction from an initial position so as to return the knob ring toward the initial position when an external force is released.

* * * * *